US008052095B2

(12) United States Patent
Wilson et al.

(10) Patent No.: US 8,052,095 B2
(45) Date of Patent: Nov. 8, 2011

(54) AUTODRAG FUNCTION FOR GLIDE SLOPE CONTROL

(75) Inventors: Douglas L. Wilson, Mercer Island, WA (US); Julie R. Brightwell, Everett, WA (US); Christopher P. Beamis, Edmonds, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 11/763,754

(22) Filed: Jun. 15, 2007

(65) Prior Publication Data

US 2008/0308681 A1 Dec. 18, 2008

(51) Int. Cl.
*B64C 19/00* (2006.01)
(52) U.S. Cl. ............... 244/188; 244/183; 244/99.12
(58) Field of Classification Search ............ 244/99.12
See application file for complete search history.

(56) References Cited

U.S. PATENT DOCUMENTS

| | | | |
|---|---|---|---|
| 3,586,268 A * | 6/1971 | Melvin | 244/188 |
| 4,146,200 A * | 3/1979 | Borzachillo | 244/225 |
| 4,261,537 A | 4/1981 | Frosch et al. | |
| 4,489,907 A | 12/1984 | Ziegelmeyer | |
| 5,365,446 A * | 11/1994 | Farineau et al. | 701/3 |
| 5,375,793 A * | 12/1994 | Rivron et al. | 244/99.8 |

FOREIGN PATENT DOCUMENTS

DE 726325 10/1942

OTHER PUBLICATIONS

PCT Intl Search Report and Written Opinion for Application No. PCT/US2008/064297, dated Apr. 2, 2009, 13 pgs.

* cited by examiner

*Primary Examiner* — Joshua Michener
*Assistant Examiner* — Brian M O'Hara
(74) *Attorney, Agent, or Firm* — Caven & Aghevli LLC (57) ABSTRACT

Systems and methods for providing supplemental drag to an aircraft are disclosed. In one embodiment, a method includes detecting changes in at least one throttle resolver angle (TRA). Deflections are determined for one or more flight control surfaces based on the changes in TRA, and accordingly, the one or more flight control surfaces are deflected automatically to generate supplemental drag. The one or more flight control surfaces include at least one at least one of an aileron, a spoiler, and an elevator. Additionally, in one instance, the deflections of the one or more flight control surfaces is implemented as a rated limited time lag function of the changes in TRA.

12 Claims, 6 Drawing Sheets

AUTODRAG FUNCTION FOR GLIDE SLOPE CONTROL

FIELD OF THE INVENTION

This invention relates to systems and methods for controlling aircraft, and more specifically, to systems and methods for controlling aircraft descent during landing.

BACKGROUND OF THE INVENTION

Innovation and technical advancements have enabled aircraft manufacturers to produce new aircraft that experience lower drag during landings than prior generations of aircraft. Lower drag may reduce the level of noise generated during landing. Aircraft with diminished noise levels during landing may be certified to use more airports than aircraft that produce more noise. However, lower drag may occasionally adversely impact an aircraft's ability for glide slope control. In other words, aircraft with lower drag may not have the desired capability to descend at a sufficiently slow rate of speed while flying on a standard approach glide slope for landing. The ability of an aircraft to slow down while flying on a standard approach glide slope may be described in terms of the incremental glide slope capability, that is, how much steeper than a standard 3° glide slope the aircraft can fly with idle thrust and landing flaps. In some cases, modern commercial aircraft being designed for reduced noise levels may experience a corresponding reduction in glide slope capability (e.g. 1 to 2 degree reduction) in comparison with comparable commercial aircraft having normal noise output.

One way pilots may attempt to compensate for diminished glide slope capability during landing is by manually adding drag, e.g., by extending the landing gear early or using in-air speed brakes. However, these practices often produce inconsistent results. Moreover, the use of in-air speed brakes is generally not recommended at landing flap settings. Another method of compensation is to reduce idle thrust levels. However, the reduction of idle thrust level is not possible with certain aircraft and engine configurations. Moreover, the reduction of idle thrust levels may conflict with the need to prevent icing in certain inclement weather conditions. Therefore, novel systems and methods that offer consistent and dependable compensation for reduced glide slope capability during landing would have utility.

SUMMARY OF THE INVENTION

The present disclosure is directed to systems and methods for automatically adding supplemental drag to an aircraft to increase glide slope capability during landing. Specifically, the added drag may enable such an aircraft to descend more rapidly and reduce airspeed more quickly during landing approach. In this way, the aircraft may be better able to descend and capture a glide slope without increasing speed. Alternatively, the capability of such an aircraft to slow down while flying on a standard approach glide slope may be enhanced.

In accordance with various embodiments, a method for providing supplemental drag during landing includes detecting changes in at least one throttle control device or signal, herein referred to as a throttle resolver, with control signals referred to as throttle resolver angle (TRA). The method further includes determining deflections for one or more flight control surfaces based on the changes in TRA, and implementing the determined deflections of the one or more flight control surfaces to generate supplemental drag and associated desirable pitching moment. In one embodiment, the flight control surfaces include at least one of an aileron, a spoiler, and an elevator.

In other embodiments, an aircraft equipped with a supplemental drag system is disclosed. The aircraft comprises a structural assembly, and at least one system for implementing supplemental drag at least partially disposed within the structural assembly. The system for supplemental drag implementation includes an input component configured to provide changes in at least one throttle resolver angle (TRA). A determination component is configured to determine deflections for one or more flight control surfaces based on the changes in TRA, and a command component is configured to implement the determined deflections of the one or more flight control surfaces to generate supplemental drag. In one particular embodiment, the command component is configured to deflect at least one of an aileron, a spoiler, and an elevator.

While specific embodiments of the invention have been illustrated and described herein, as noted above, many changes can be made without departing from the spirit and scope of the invention. Accordingly, the scope of the invention should not be limited by the disclosure of the specific embodiments set forth above. Instead, the invention should be determined entirely by reference to the claims that follow.

BRIEF DESCRIPTION OF THE DRAWINGS

Embodiments of systems and methods in accordance with the teachings of the present disclosure are described in detail below with reference to the following drawings.

DETAILED DESCRIPTION

Embodiments of systems and methods in accordance with the present disclosure are directed to automatically providing supplemental drag to an aircraft to increase glide slope capability. Many specific details of certain embodiments of the invention are set forth in the following description and in FIGS. 1-5 to provide a thorough understanding of such embodiments. The present invention may have additional embodiments, or may be practiced without one or more of the details described below.

Generally, embodiments of systems and methods in accordance with the present disclosure may advantageously improve glide slope capability and deceleration capability of an aircraft. These improvements may enable an aircraft with reduced glide slope capability, such as aircraft designed for reduced noise output during landing, to descend more rapidly and reduce airspeed more quickly during landing approach. In this way, the aircraft may be better able to descend and capture a glide slope without increasing speed. Alternatively, embodiments of systems and methods in accordance with the present disclosure may advantageously enhance the ability of such an aircraft to slow down while flying on a standard approach glide slope.

Figure 1:
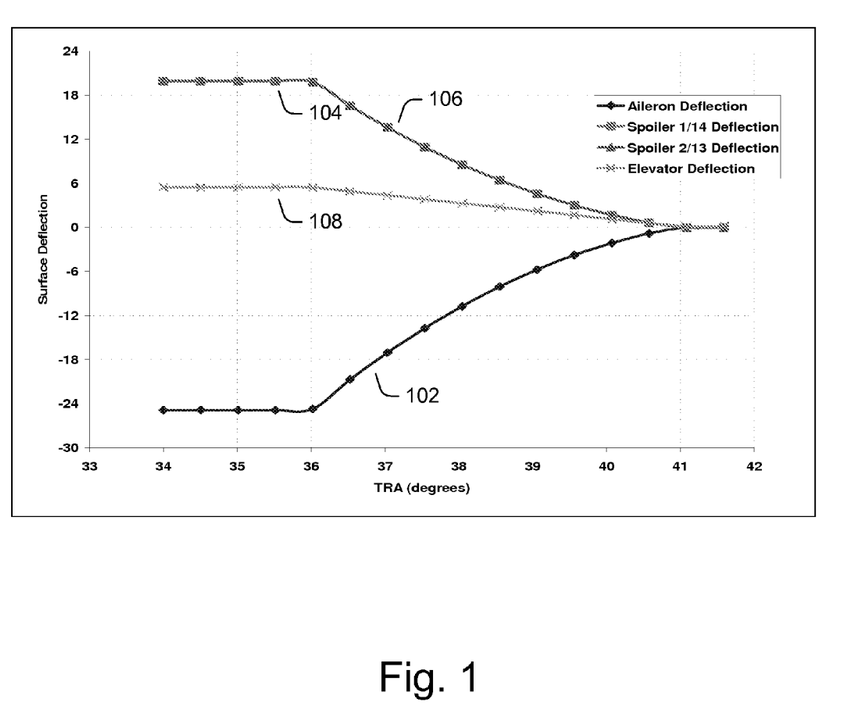
FIG. 1 is a graphical representation that depicts exemplary flight control surface deflections that provide supplemental drag to an aircraft, in accordance with an embodiment.

FIG. 1 depicts exemplary flight control surface deflections that provide supplemental drag, including desirable pitching moment associated with the supplemental drag, to an aircraft to increase glide slope capability during landing. The supplemental drag may improve the glide slope ability and deceleration capability of the landing aircraft. As shown, supplemental drag may be achieved by the automatic deflections of aircraft flight control surfaces. These flight control surfaces may include one or more ailerons, one or more spoilers, and one or more elevators. This automatic process of deflecting flight control surfaces to provide supplemental drag to an aircraft may be referred to as "auto drag".

The automatic deflection of flight control surfaces to achieve supplemental drag may be implemented as a function of a control signal generated by a thrust control device. The thrust control device may be referred to as a throttle resolver, and the corresponding control signal may be referred to as the throttle resolver angle (TRA). In other words, the degree of deflection for each flight control surface is related to and dependent on the degree of the TRA in these implementations. Throttle resolver angle (TRA) may be defined as the physical angle (position) of the throttle stick with respect to a level surface. Generally, the throttle is used to control engine power level (thrust) because it sets the amount of fuel and/or air delivered. According to various embodiments, the "auto drag" function may be activated when the throttle resolver angle during landing is in a range of between approximately 41° and approximately 36°, inclusive. Of course, in other embodiments, the auto drag function may be activated in other TRA ranges or TRA values.

Figure 2:
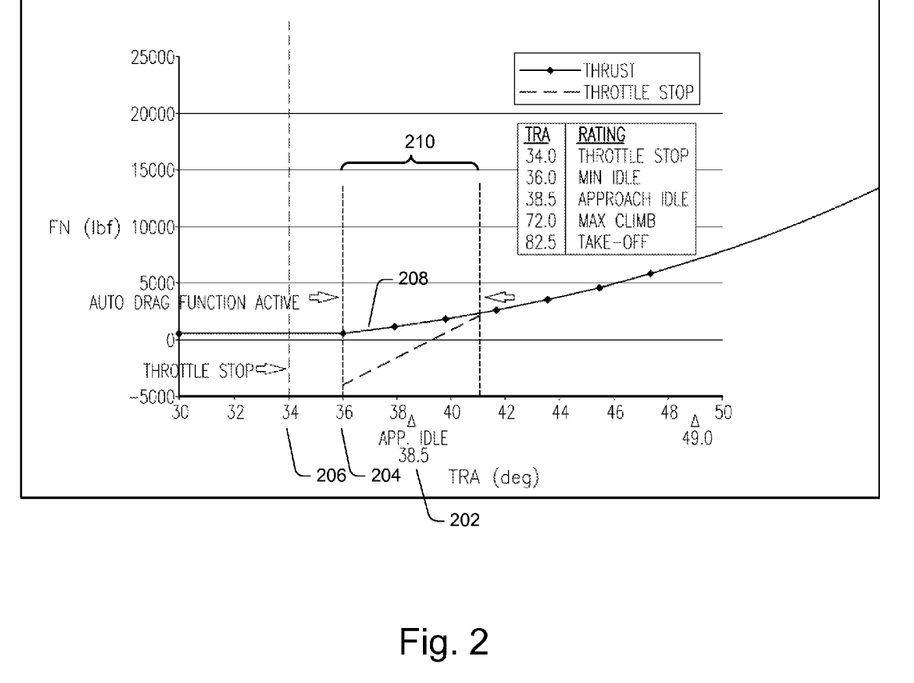
FIG. 2 is a graphical representation of an exemplary range of throttle resolve angles (TRA) for which an auto drag function that provides supplemental drag in accordance with an embodiment is implemented.

FIG. 2 provides additional details regarding the activation of auto drag in response to changes in throttle resolver angle. Specifically, FIG. 2 shows an exemplary range of throttle resolver angles during landing. As shown, a TRA of approximately 38.5° may correspond to approach idle 202, a TRA of approximately 36° may correspond to minimum idle 204, and a TRA of approximately 34° may correspond to throttle stop 206. FIG. 2 also shows the corresponding engine thrust 208 during the transition between these throttle resolver angles. Moreover, FIG. 2 also shows the activation 210 of an auto drag function between a TRA of approximately 41° and approximately 36°, inclusive, as described above.

Returning to FIG. 1, a range for the throttle resolve angle as typically used by an aircraft during landing is depicted on the x-axis. Moreover, FIG. 1 also includes a y-axis that provides a range of surface deflection in degrees. Lines 102-108 depict the deflections of various flight control surfaces by the auto drag function in accordance with an embodiment. For example, the line 102 graphically represents the change in the deflection of ailerons during the transition of the throttle resolver angle from 41° to 36°. The line 104 graphically represents the change in the deflection of a first pair of spoilers (e.g., spoilers 1 and 14) during the same throttle resolver angle transition. Likewise, the deflections of a second pair of spoilers (e.g., spoilers 2 and 13) during the same transition are depicted by line 106. Moreover, the deflections of elevators during the same transition are depicted by line 108. It will be appreciated that the automatic deflections of these flight control surfaces, as represented by the lines 102-108, may advantageously provide a variable amount of supplemental drag to improve glide slope capability and deceleration capability of an aircraft during landing. In some embodiments, the flight control surfaces are deflected simultaneously, as described below with reference to FIG. 4. Alternately, the flight control surfaces may be deflected non-simultaneously to achieve the desired auto drag functionality.

Figure 3A:
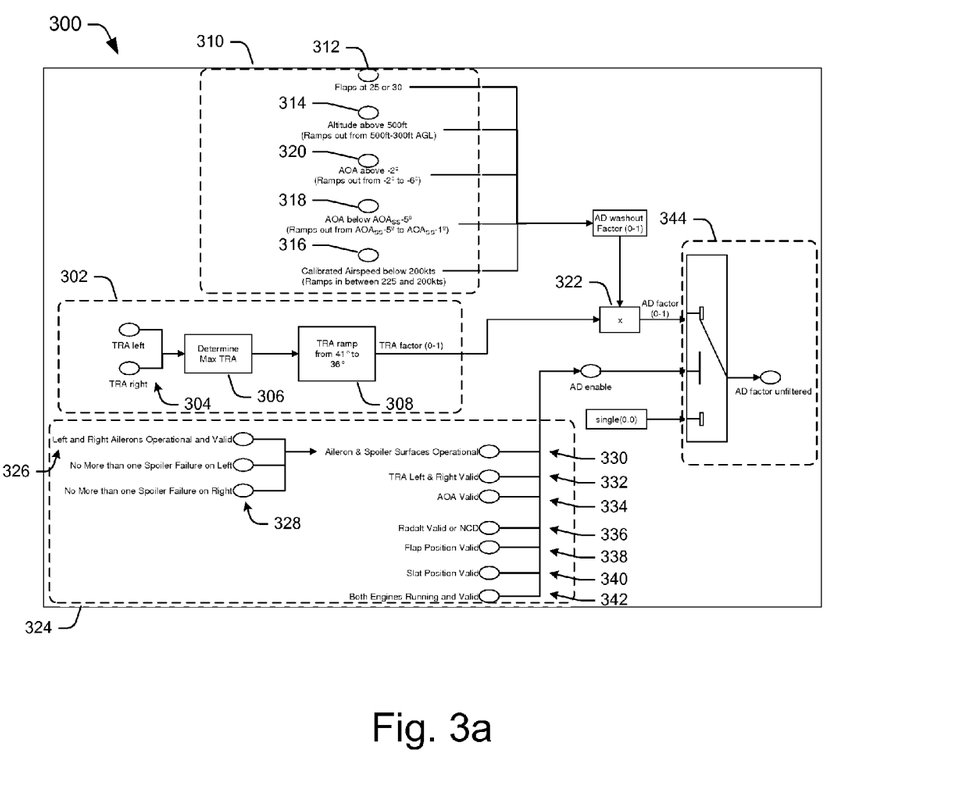
FIGS. 3a and 3b illustrate a block diagram depicting an exemplary auto drag software algorithm that automatically provides supplemental drag to an aircraft with low glide slope capability during landing, in accordance with an embodiment.
Figure 3B:
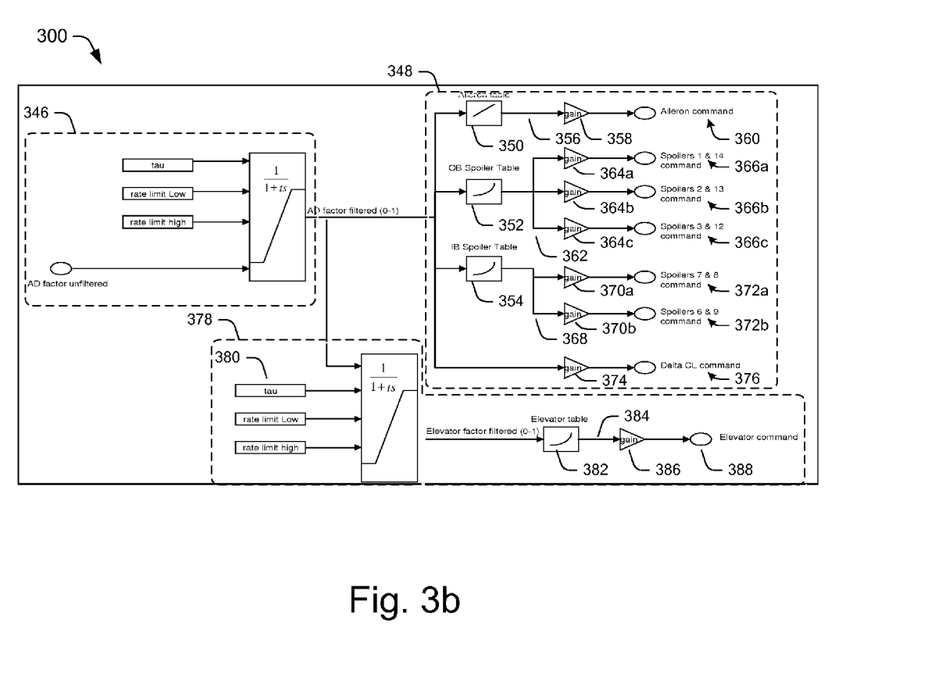

FIGS. 3a and 3b illustrates a block diagram depicting an exemplary auto drag system 300 that may be used to provide supplemental drag to an aircraft during landing. The auto drag system 300 may be implemented in an avionic system located onboard an aircraft. For example, in one instance, the auto drag system 300 may be implemented in a flight control computer. In other instances, the auto drag system 300 may be implemented in an autopilot, a flight management computer (FMC), a flight management system (FMS), or other avionic systems.

Generally, the auto drag system 300 may include software components, hardware components, or combinations of both, and may be implemented in a computer system that has processing capabilities (e.g., one or more computer instruction processors) and memory suitable to store, fetch, and execute computer-executable instructions. According to various embodiments, the memory may include volatile and nonvolatile memory, removable and non-removable media implemented in any method or technology for storage of information, such as computer-readable instructions, data structures, program modules or other data. Such memory includes, but is not limited to, random access memory (RAM), read-only memory (ROM), electrically erasable programmable read-only memory (EEPROM), flash memory or other memory technology, compact disc, read-only memory (CD-ROM), digital versatile disks (DVD) or other optical storage, magnetic cassettes, magnetic tape, magnetic disk storage or other magnetic storage devices, redundant array of independent disks (RAID) storage systems, or any other medium which can be used to store the desired information and which can be accessed by a computer system.

The auto drag system 300 may include a plurality of modules (e.g., software, hardware, or combinations thereof). Specifically, each of the modules may be implemented to carry out specific functions. Accordingly, these modules may include computer-executable instructions that are executed by one or more computer instruction processors.

As shown in FIG. 3a, the auto drag system 300 may include a command portion 302 that is configured to determine the throttle resolver angle (TRA) for the implementation of the auto drag function. More specifically, in this embodiment, the command portion 302 includes a first module 304 configured to receive TRA for one or more throttles (e.g. the left and right throttles). Once the throttle positions are received, a second module 306 may determine the higher (or maximum) of the throttle resolver angles of the one or more throttles. A third module 308 then may compare this maximum TRA with a pre-established range of throttle resolver angles to derive an auto drag command. In one implementation, the pre-established range of throttle resolver angles varies between a first angular threshold and a second angular threshold.

In this implementation, the third module 308 may be configured to provide one or more signals that are configured to ramp the auto drag function from no effect to full effect as the TRA decreases from the first angular threshold to the second angular threshold. In other words, the one or more signals may cause the auto drag function to inversely increase in effect as the TRA diminishes during landing. This process may be referred to as a "ramp in" of the auto drag function. For example, in one embodiment, the third module 308 may generate a signal that sets the auto drag function at minimal effect as the throttle resolver angle reaches 41° (first angular threshold or initial idle). Moreover, the third module 308 may generate additional signals that cause the auto drag function to increase in effect in substantially inverse proportion to the throttle resolver angle until the effect of auto drag function is at full effect at 36° (second angular threshold or minimum idle). It will be appreciated that the one or more signals generated by the third module 308 may be referred to collectively as the "TRA factor".

As further shown in FIG. 3a, a "wash out" portion 310 may be employed to supply an auto drag function "wash out" factor. The auto drag function "wash out" factor is configured to diminish the effect of the auto drag function on the flight control surfaces of an aircraft. As described below, the wash out portion 310 provides the auto drag "wash out factor" when certain flight conditions necessitate the gradual modification and/or termination of the auto drag function.

Specifically, in this embodiment, the wash out portion 310 includes a flap monitoring module 312 that determines whether the flaps are in the landing configuration. Accordingly, in one embodiment, the auto drag function is only activated if the flaps are at 25° or 30°. This may ensure that the auto drag function is not activated when an aircraft is taking off or climbing. Therefore, the flap monitoring module 312 may provide a first signal, i.e., an "on" signal, if the flaps are in the landing configuration (e.g., 25° or 30°) so that the auto drag function may be activated. Conversely, the flap monitoring module 312 may provide a second signal, i.e., an "off" signal, when the flaps are not in the landing configuration and the auto drag function should not be activated.

The one or more throttles are normally pulled back (or otherwise throttled down) to reduce thrust levels shortly before touch down. Accordingly, it may be necessary to disable the auto drag function when an aircraft is close to the ground to ensure that the touch down attitude is unaffected. As shown in FIG. 3a, a terminal phase module 314 may be used to gradually disable the auto drag function. In one embodiment, the terminal phase module 314 may be configured to receive radar altimeter readings to monitor when the aircraft is approaching touch down and to adjust the auto drag function accordingly. Moreover, the terminal phase module 314 may be further configured to provide one or more signals that "ramps out" the auto drag function, i.e., decrease the effect of the auto drag function on surface deflections as the aircraft descends from an initial altitude above ground level to a minimum altitude above ground level. In one implementation, for a commercial passenger aircraft, the initial altitude is 500 feet above ground level and the minimum altitude is 300 feet above ground level. Of course, in alternate embodiments, other altitude ranges and values may be used. Moreover, the terminal phase portion 314 may implement the one or more "ramp out" signals in direct proportion to the aircraft's descent from the initial height to the lower height, until a signal terminating the auto drag function is provided by the terminal phase portion 314 at the minimum altitude.

A negative angle of attack (AOA) module 316 may be configured to ramp out the auto drag function. Specifically, the negative AOA module 316 may be configured to detect that the aircraft is performing a negative angles of attack, and may provide one or more signals that gradually "ramps out", i.e., decreases the effect of the auto drag function in direct proportion to changes in the angle of attack (AOA). In one implementation, the negative AOA module 316 may provide one or more signals that gradually "ramps out" or decreases the effect of the auto drag function between and AOA of approximately −2° and an AOA of approximately −6°. This means that the auto drag function may be at full effect when the AOA is at approximately −2°. However, at approximately the maximum AOA angle, e.g., −6°, the auto drag function may be fully "ramped out," that is, terminated.

Further, it may be necessary to terminate the auto drag function during certain operating conditions as the aircraft approaches high angles of attack that may result in stall. Terminating the auto drag function in these instances may serve to prevent the auto drag function from affecting the stall speed of an aircraft. Accordingly, a stall monitoring module 318 may be configured to terminate the auto drag function in relation to stick shaker or other stall warning system activation. It will be appreciated that a stick shaker is a mechanical device that is configured to vibrate the controls of an aircraft when the aircraft is close to stalling.

Specifically, the stall monitoring module 318 may detect whether the angle of attack (typically in combination with airspeed) of the aircraft reaches an initial setting (in degrees) below the threshold at which a stall warning system (e.g. stick shaker) is activated, and this threshold may be referred to as AOA stick shaker. Additionally, the stall monitoring module 318 may be configured to gradually "ramp out" the effect of the auto drag function from full to zero between this initial degree setting and a secondary setting (in degrees).

In one implementation, between 5° and 1° below the stick shaker threshold, the stall monitoring module 318 may provide one or more signals that gradually "ramps out" the effect the auto drag function from full to zero, respectively. For instance, the stall monitoring module 318 may provide the one more "ramp out" signals in direct proportion to the magnitude of the AOA. In other words, at approximately 5° below the stick shaker threshold, or AOA stick shaker, the auto drag function is at full effect. The effect of the auto drag function then proportionally diminishes as the AOA continues to increase. This diminution in the auto drag function may continue until at approximately 1° below the stick shaker threshold, where the one or more signals provided by the stall monitoring module 318 may be completely terminate the auto drag function.

Additionally, in certain embodiments, when the auto drag function is active, a lift coefficient correction factor may be provided for the stick shaker activation threshold calculation. The lift coefficient correction factor may mitigate the impact of an activated auto drag function on the predicted stick shaker threshold. This is described in further detail below.

As further shown in FIG. 3a, an airspeed module 320 may be configured to gradually ramp in the auto drag function when the aircraft's airspeed decreases from an initial speed threshold to lower a secondary speed threshold. In one implementation, for a commercial passenger aircraft, the initial speed threshold may be approximately 225 knots, and the secondary speed threshold may be approximately 200 knots. Specifically, the airspeed module 320 may provide a signal that initiates the "ramp in" at 225 knots, and gradually increase the "ramp in", that is, provide one or more signals that increase the effect of the auto drag function until full "ramp in" is reached at 200 knots. In one implementation, the airspeed module 320 may carry out the "ramp in" in direct inverse proportion to the airspeed. In other words, at 225 knots, the auto drag function is not active. However, at 200 knots, the auto drag command is at full effect.

Subsequently, the auto drag function may remain at full effect for all air speeds below 200 knots. This ramp in of the auto drag command between 225 and 200 knots, and the subsequent full activation of the auto drag function at 200 knots and below, may ensure that the auto drag function is not inadvertently activated in the event that flap signal failure occurs at cruising speeds.

It will be appreciated that the modules 312-320 of the wash out portion 310 may be configured to provide "ramp out" and "ramp in" signals in a variety of ways. For example, the wash out portion 310 may provide a first signal if the aircraft altitude is appropriate for the auto drag function to be at full effect. Conversely, the wash out portion 310 may provide second signal, if the flap angle necessitates the termination of the auto drag function. Moreover, the wash out portion 310 may be further configured to provide additional signals that correspond to the incremental "ramp out" of the auto drag function. It will be further appreciated that the signals may take any form. In one instance, the first signal may be an "on" logic signal, as represented by "1", and the second signal may be an "off" logic signal, as represented by "0".

Moreover, the wash out portion 310 may include one or more additional software modules that are configured to process the various signals, including the signal from the flap monitoring module 312, and the "ramp out" and "ramp in" signals provided by the other modules 314-318. In one embodiment, the wash out portion 310 may be configured to simultaneously sense signals from the various modules 312-320, and to combine and process the signals to determine the "auto drag wash out" factor.

In one embodiment, the wash out portion 310 may produce an auto drag function termination signal if any of the signals from the modules 312-320 indicate that flight conditions necessitate the suspension of the auto drag function. For example, the wash out portion 310 may receive a plurality of logic signals "1" from the modules 312 and 316-320. However, if the wash out portion 310 also receives a logic signal "0" from the terminal phase module 314 (due to the fact that the aircraft is below the minimum altitude of 300 feet), the wash out portion 310 may use logic processing to determine that the auto drag "wash out factor" should be terminated.

Additionally, the wash out portion 310 may "multiply" the various signals, including the "ramp out" and "ramp in" signals, to produce an appropriate auto drag "wash out factor." In other words, the auto drag "wash out factor" may be a multiplicative product of the various signals generated by the modules 312-320, wherein each signal is a contributing factor to the magnitude of the auto drag "wash out factor." It will be appreciated that the wash out portion 310 may further implement the various processes as logic algorithms, i.e., including Boolean logic and/or fuzzy logic algorithms.

The auto drag system 300 may also include a combiner module 322. The combiner module 322 may be configured to combine the TRA factor, as generated by the command portion 302, with the auto drag "wash out" factor generated by the wash out portion 310, to generate an auto drag (AD) factor. In one implementation, the auto drag factor is a multiplicative product of the auto drag wash out factor and the TRA factor. In this way, the "ramp out" and "ramp in" aspects, as generated by the various modules of the auto drag software algorithm, may be integrated to form the auto drag factor.

As further shown in FIG. 3a, a system verification portion 324 of the auto drag system 300 may be employed to verify the operation of the various flight systems and flight control surfaces. More specifically, in this embodiment, an aileron module 326 may be configured to verify that the left and right ailerons are operational and able to correctly receive command input. A spoiler module 328 may verify the operation of the left spoilers. In one embodiment, the spoiler module 328 may determine the operational state of the left spoilers as valid when it has detected no more than one left spoiler failure. Likewise, the spoiler module 328 may verify the operation of the right spoilers. In one embodiment, the spoiler module 328 may determine the operational state of the right spoilers as valid when it has detected no more than right spoiler failure.

Moreover, the aileron and spoiler modules 326-328 may be further configured to pass the operation state of the ailerons and spoiler control surfaces to a first control surface module 330. In turn, the first control surface module 330 may output a first control surface state that indicates the first control surfaces (e.g. ailerons and spoilers) are "valid" if they are operational, or a second control surface state that indicates the status of the control surfaces as "invalid" if at least one of the first control surfaces is not operational.

Similarly, a TRA validity module 332 may be configured to verify whether the auto drag system 300 is receiving valid TRA input. In one embodiment, the TRA validity module 332 may be configured to output a "valid" TRA state that signifies that the auto drag software algorithm is receiving TRA input. Conversely, an "invalid" TRA state may be outputted by the software module 330 if the auto drag system 300 is not receiving a TRA input.

An AOA validity module 334 may be configured to verify whether the auto drag system 300 is receiving valid AOA input. In one embodiment, the AOA validity module 334 outputs a "valid" AOA state that indicates valid AOA input is being received, and outputs an "invalid" AOA state if valid AOA input is not being received by the auto drag system 300.

Moreover, an altitude validity module 336 may be employed to ensure that the detected radar altitude is valid. In one embodiment, the altitude validity module 336 may be configured to determine the operation status of the radar altimeter. For example, the altitude validity module 336 may output a "valid" radar state that indicates the radar altimeter is operational. Alternatively, the altitude validity module 336 may output an "invalid" state that indicates that radar altimeter was not able to generate valid altitude data.

A flap validity module 338 may be configured to determine whether the auto drag system 300 is receiving valid flap position input. In one embodiment, the flap validity module 338 may be configured to output a "valid" flap state that signifies that the auto drag system 300 is receiving valid flap position input. Conversely, the flap validity module 338 may output an "invalid" flap state if the auto drag system 300 is not receiving valid flap position input.

A slat validity module 340 may be configured to determine whether the positions of the leading edge slats are valid. It will be appreciated that slats may be used to change the AOA of the wings. Accordingly, the slat validity module 340 may be configured to output a "valid" slat state that signifies that the auto drag system 300 is receiving valid flap position input, and output an "invalid" slat state if the auto drag system 300 is not receiving a valid slat position input.

The engine validity module 342 may be configured to determine the status of one or more engines. In one embodiment, the engine validity module 342 may be configured to output a "valid" engine state that signifies that the auto drag system 300 is receiving valid engine performance data (e.g. thrust data) and that the data indicates that the engines are running. Conversely, an "invalid" engine state may be outputted by the engine validity module 342 if the auto drag system 300 is not receiving valid engine data.

Moreover, system verification portion 324 may include one or more additional modules that are configured to process the various signals from the component validity modules 330-342. According to various embodiments, the system verification portion 324 may be configured to simultaneously sense the outputted states from the component validity modules 330-342, and may provide an "auto drag enable" signal if no "invalid" states are received. The "auto drag enable" signal indicates that the auto drag system 300 is receiving appropriate data inputs for the implementation of the auto drag function. However, if the system verification portion 324 receives at least one "invalid" state from the component validity modules 330-342, the system verification portion 324 may generate an "auto drag disable" signal. In one implementation, the generated "auto drag enable" signal may be a logical signal "1", and the generated "auto drag disable" signal may be a logical signal "0".

A master switch portion 344 is also included in the auto drag system 300. The master switch portion 344 performs a "switch" function that, if appropriate, passes on the auto drag factor to the appropriate systems of the aircraft. In one embodiment, the master switch portion 344 is configured so that it passes on the auto drag factor if an "auto drag enable" signal is received from the system verification portion 324. Conversely, if the master switch portion 344 receives an "auto drag disable" signal from the system verification portion 324, the "switch" function may disengage so that no auto drag factor is passed on beyond the master switch portion 344.

Figure 4:
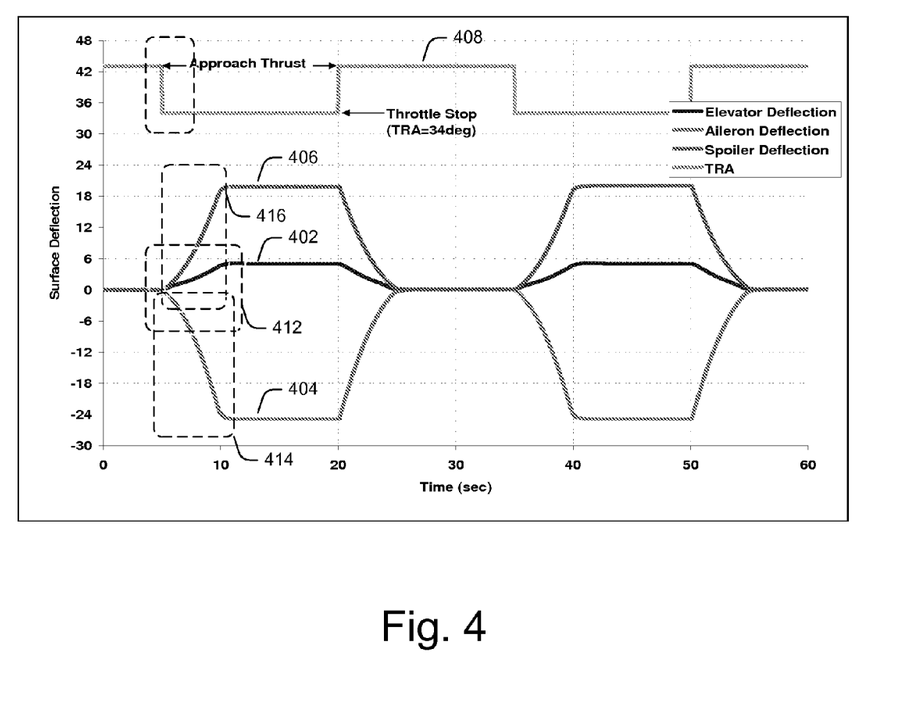
FIG. 4 is a graphical representation depicting flight control surface responses to throttle resolver angle (TRA) changes, as implemented by an exemplary auto drag software algorithm, in accordance with an embodiment.

Additional aspects of the auto drag system 300 are shown in FIG. 3b, which shows a filter module 346 that receives and filters the auto drag factor received from master switch portion 344 of FIG. 3a. According to various embodiments, the filter module 346 may filter any changes in the auto drag factor with a first-order lag. Additionally, changes in the auto drag factor may be further rate limited by both low and high rate limits by the filter module 346. Specifically, since changes to the auto drag factor correlate with changes in the TRA, the first-order lag and the rate limitations may be employed to emulate the basic throttle response experience by a pilot. Moreover, the lag and limitations may also minimize disturbance in instances where the TRA is abruptly changed (e.g., throttle pulled back suddenly). To put it another way, most commercial pilots expect an aircraft to respond gradually when the TRA is changed, due to throttle lag, or the time it takes a jet engine to spin up or spin down. Thus, the changes in auto drag factor are filtered by the filter module 346 so that the effects of the auto drag function on an aircraft closely resemble the typical aircraft response to TRA change. The effect of this auto drag factor filtering, as ultimately propagated to the various flight control surfaces, is illustrated in FIG. 4, as described below.

Returning to FIG. 3b, subsequent to filtration by the filter module 346, the filtered auto drag factor may be passed on to a control signal portion 348 so that deflection commands to the flight control surfaces may be generated. In one implementation, the control signal portion 348 may include tables 350-354 that store two-dimensional data that supplies surface deflection in relation to the strength of the filtered auto drag factor. For example, the tables 350-354 may provide greater surface deflections for strong auto drag factors. On the other hand, small or washed out auto drag factors may be correlated to small surface deflections in the tables 350-354. Accordingly to various embodiments, the tables 350-354 may include non-linear tables as well as linear tables. As shown, the filtered auto drag factor may be passed on to an aileron table 350, an outboard spoiler table 352, and an inboard spoiler table 354. In alternate embodiments, other suitable tables may be included. In further embodiments, the tables may be replaced with equations or other suitable means of determining the control signals.

Once the tables 350-354 have enabled the control signal portion 348 to generate the necessary surface deflection signals, the deflection signals may be amplified and passed on to the respective control surfaces. In one embodiment, the control signal portion 348 may amplify the calculated aileron surface deflection signals 356, as provided by aileron table 350, by a gain 358, before passing on calculated deflection to the ailerons as aileron command 360.

Similarly, the control signal portion 348 may amplify the outboard spoiler deflection signals 362, as provided by the outboard spoiler table 352, by one or more gains 364, before passing on the deflection signal 366 to the corresponding outboard spoilers. In a specific embodiment, where the aircraft is a 787 model commercial aircraft manufactured by the Boeing Company of Chicago, Ill., the control signal portion 348 may amplify the deflection signals 362 from the outboard spoiler table 352 by separate gains 364a, 364b, and 364c, respectively, the deflection signals are then passed on as separate commands 366a, 366b, 366c, to the respective outboard spoilers 1 and 14, spoilers 2 and 13, and spoilers 3 and 12.

Similarly, the control signal portion 348 may further amplify the inboard spoiler deflection signals 368, as provided by the inboard spoiler table 354, by one or more gains 370. Subsequently, the deflection signal 372 may be passed on to the inboard spoilers. Once again, in an embodiment where the aircraft is a Boeing 787 commercial aircraft, the deflection signals 368 may be amplified by gains 370a and 370b, and the deflection signals may then be passed on as separate commands 372a and 372b to spoilers 7 and 8 and 6 and 9, respectively.

The control signal portion 348 may be further configured to amplify the auto drag factor by a gain 374 to form a Delta CL command 376. As described above, the activation of the auto drag function may affect the relationship between the AOA and the coefficient of lift (CL). Accordingly, the Delta CL command 376, after being amplified by a gain 374, may be passed back to the AOA module 318 to adjust the stick shaker activation threshold calculation.

The auto drag system 300 may further include a second filter portion 378. The second filter portion 378 may include one or more modules 380 that further filter the filtered auto drag factor passed on by master switch portion 344. According to various embodiments, the auto drag factor may be further filtered by the second filter portion 378 with a first-order lag that is rate limited by both high and low limitations, (in the same manner the original auto drag factor is filtered by the filter portion 346). Accordingly, filtered elevator factors are generated. The filtered elevator factors generated by the second filter portion 378 may be employed to create pitch responses that compensate for pitch upsets caused by the deflections of the ailerons and spoilers during activation of the auto drag function. In one embodiment, the additional filtering performed by the second filter portion 378 is configured to prevent the aircraft's nose from rising perceptibly when the throttles are cut sharply.

Specifically, the filter elevator factors may be passed on to elevator table 382 so that elevator deflection signals 384 to the elevators may be generated. In one implementation, the elevator table 382 may store the two-dimensional data that supplies elevator deflection in relation to the strength of the filter elevator factor. For example, the table 382 may provide greater surface deflections for strong filtered elevator factor. On the other hand, a washed out filtered elevator factor may be correlated to small elevator deflections. Accordingly to various embodiments, the elevator table 380 may include a non-linear table, such as in instances where the tables 350-354 are non-linear tables. In other embodiments, the elevator table 382 may include a linear table.

Therefore, the second filter portion 378 may generate elevator deflection signals 384 based on the filtered elevator factor and the elevator table 382. The elevator deflection signals 384, amplified by a gain 386, are then passed on as elevator commands 388 to control the elevators.

FIG. 4 graphically represents the effect of auto drag factor filtering on the response of flight control surfaces to throttle resolver angle (TRA) changes. As shown, time in seconds are depicted on the x-axis, and surface deflections in degrees are depicted on the y-axis. Elevator deflection 402, aileron deflection 404, and spoiler deflection 406 are plotted against the corresponding change in TRA 408. As can be readily appreciated from FIG. 4, filter portions 346 and 378 may filter the changes in auto drag factor (by lag and rate limitation functions) such that changes in the TRA, (e.g., 410), are eventually propagated as gradual first-order changes (e.g., 412, 414, 416) in the deflection angles of the respective flight control surfaces.

In summary, the auto drag system 300 may advantageously provide supplemental drag to an aircraft to improve glide slope capability during landing by automatically deflecting various flight control surfaces in accordance with the throttle resolver angle (TRA) control signal, or equivalent thrust control signals, including digital and analog control signals. In the embodiments described above, the flight control surfaces may include one or more ailerons, one or more spoilers, and one or more elevators. However, it will be appreciated that in other implementations, additional control surfaces may also be deflected to provide supplemental drag. It will be further appreciated that in other embodiments, one or more functions of the auto drag software algorithm may be implemented using hardware components rather than software modules. These hardware components may include dedicated electrical circuits, dedicated integrated circuits, mechanical devices (e.g., relays, contacts, and switches), other equivalent electrical or mechanical components, or combinations thereof. In other words, the software modules of the auto drag software algorithm may be substituted and carried out using hardware, as long as the overall operation of the auto drag function remains the same.

Figure 5:
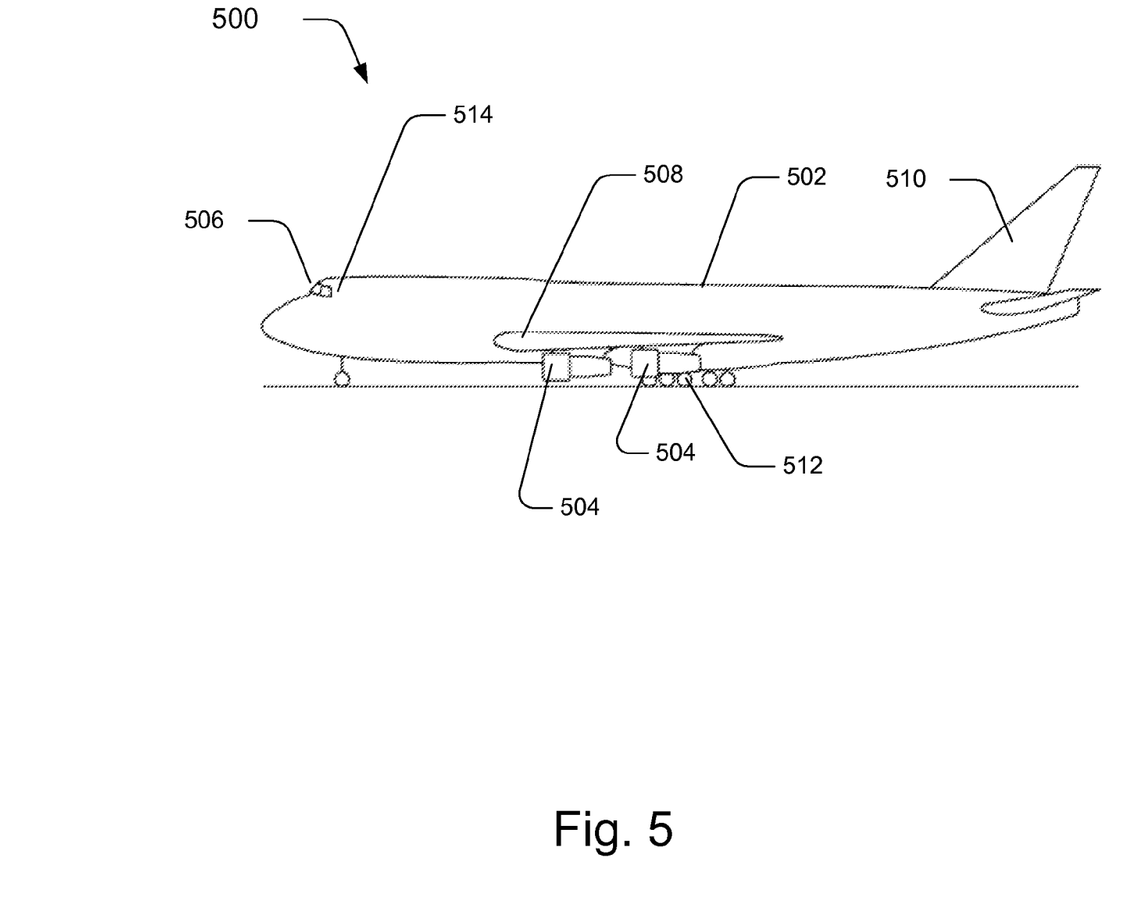
FIG. 5 is a side elevational view of an aircraft equipped with an avionics system that automatically provides supplemental drag, in accordance with another embodiment.

FIG. 5 is a side elevational view of an aircraft 500 in accordance with an embodiment of the present invention. In general, except for one or more systems in accordance with the present invention, the various components and subsystems of the aircraft 500 may be of known construction and, for the sake of brevity, will not be described in detail herein. As shown in FIG. 5, the aircraft 500 includes one or more propulsion units 504 coupled to a fuselage 502, a cockpit 506 in the fuselage 502, wing assemblies 508 (or other lifting surfaces), a tail assembly 510, a landing assembly 512, a control system (not visible), and a host of other systems and subsystems that enable proper operation of the aircraft 500. At least one component of an auto drag function system 514 formed in accordance with the present invention is located within the fuselage 502. However, components of the capture maneuver system 514 may be distributed throughout the various portions of the aircraft 500.

Although the aircraft 500 shown in FIG. 5 is generally representative of a commercial passenger aircraft, including, for example, the 737, 747, 757, 767, 777, and 787models commercially-available from The Boeing Company of Chicago, Ill., the inventive apparatus and methods disclosed herein may also be employed in the assembly of virtually any other types of aircraft. More specifically, the teachings of the present invention may be applied to the manufacture and assembly of other passenger aircraft, cargo aircraft, rotary aircraft, and any other types of aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom. It may also be appreciated that alternate embodiments of system and methods in accordance with the present invention may be utilized in other aerial vehicles.

Embodiments of systems and methods in accordance with the present disclosure may provide significant advantages over the prior art. For example, the auto drag function may enable an aircraft to automatically compensate for reduced glide slope capability during landing. Specifically, the added drag may enable such an aircraft to descend more rapidly and reduce airspeed more quickly during landing approach. In this way, the aircraft may be better able to descend and capture a glide slope without increasing speed. Alternatively, the capability of such an aircraft to slow down while flying on a standard approach glide slope may be enhanced. Accordingly, aircraft landing performance may be improved without compromising the benefit of noise reduction provided by low drag landing configurations.

While embodiments of the invention have been illustrated and described above, many changes can be made without departing from the spirit and scope of the invention. Accordingly, the scope of the invention is not limited by the disclosure of these embodiments. Instead, the invention should be determined entirely by reference to the claims that follow.

What is claimed is:

1. A method for supplementing drag during landing, comprising:

detecting, in a controller in an aircraft, a change in at least one throttle resolver angle (TRA) for the aircraft;

determining, in the controller, a deflection for each of one or more flight control surfaces based on the change in the at least one TRA; and implementing, automatically in the controller, the determined deflection of the one or more flight control surfaces to generate supplemental drag during landing, wherein the one or more flight control surfaces includes an elevator and at least one of an aileron or spoiler; and wherein the controller generates supplemental drag by adjusting the deflection of the ailerons, adjusting the deflection of the elevator, and adjusting the deflection of the spoilers as the throttle resolver angle is adjusted.

2. The method of claim 1, wherein implementing, in the controller, the determined deflection includes verifying, in the controller, one or more states are valid prior to implementing the determined deflection of each flight control surface, the one or more states to include left and right aileron operational states, left and right spoiler operational states, a TRA input state, an angle of attack (AOA) input state, a radar altimeter operational state, a flap operational state, or an engine operational state.

3. The method of claim 1, further comprising detecting, in the controller, at least one flap position, and wherein implementing the determined deflection includes implementing the determined deflection for each of the one or more flight control surfaces when the flap position is in the landing configuration.

4. The method of claim 1, wherein implementing, in the controller, the determined deflection includes proportionally ramping in the determined deflection for each of the one or more flight control surfaces as the at least one TRA changes from a first angular threshold to a second angular threshold, wherein the first angular threshold is greater than the second angular threshold.

5. The method of claim 1, further comprising detecting, in the controller, altitude above ground level, and wherein implementing, in the controller, the determined deflection includes implementing, in the controller, the determined deflection for each of the one or more flight control surfaces when the altitude above ground level is greater than or equal to a minimum altitude.

6. The method of claim 5, further comprising proportionally ramping out the determined deflection for each of the one or more flight control surfaces as the altitude above ground level changes from an initial altitude to the minimum altitude, wherein the initial altitude is higher than the minimum altitude.

7. The method of claim 1, further comprising detecting, in the controller, an angle of attack (AOA), and wherein implementing, in the controller, the determined deflection includes implementing the determined deflection for each of the one or more flight control surfaces when the AOA is less than or equal to a maximum AOA.

8. The method of claim 7, further comprising proportionally ramping, in the controller, out the determined deflection for each of the one or more flight control surfaces as the AOA changes from an initial AOA to the maximum AOA, wherein the initial AOA is smaller than the maximum AOA.

9. The method of claim 1, further comprising detecting, in the controller, airspeed, and wherein implementing, in the controller, the determined deflection includes implementing, in the controller, the determined deflection for each of the one or more flight control surfaces when the air speed is less than or equal to a initial airspeed threshold.

10. The method of claim 9, further comprising proportionally ramping, in the controller, in the determined deflection for each of the one or more flight control surfaces as the airspeed changes from the initial airspeed threshold to a secondary airspeed threshold, wherein the secondary speed threshold is lower than the initial speed threshold.

11. The method of claim 1, further comprising detecting, in the controller, an AOA, and wherein implementing the determined deflection includes implementing the determined deflection for each of the one or more flight control surfaces when the AOA is less than or equal to an initial setting below the threshold at which a stick shaker is activated.

12. The method of claim 11, further comprising proportionally ramping, in the controller, out the determined deflection for each of the one or more control surfaces as the AOA changes from the initial setting to the secondary setting below the threshold at which the stick shaker is activated, wherein the initial setting is less steep than the secondary setting.

* * * * *